United States Patent
Ring et al.

(10) Patent No.: US 10,035,273 B2
(45) Date of Patent: Jul. 31, 2018

(54) ELECTRIC APPLIANCE FOR PERSONAL CARE

(71) Applicant: Braun GmbH, Kronberg (DE)

(72) Inventors: Martin Ring, Glashuetten (DE); Bernhard Kraus, Braunfels (DE); Robert Schaefer, Frankfurt a.M. (DE)

(73) Assignee: Braun GMBH, Kronberg (DE)

(*) Notice: Subject to any disclaimer, the term of this patent is extended or adjusted under 35 U.S.C. 154(b) by 253 days.

(21) Appl. No.: 14/970,567

(22) Filed: Dec. 16, 2015

(65) Prior Publication Data

US 2016/0176059 A1   Jun. 23, 2016

(30) Foreign Application Priority Data

Dec. 23, 2014 (EP) .................................... 14200089

(51) Int. Cl.
*H02K 33/02* (2006.01)
*B26B 19/28* (2006.01)
*H02K 1/34* (2006.01)
*H02K 7/14* (2006.01)
*H02K 33/12* (2006.01)
*H02K 33/00* (2006.01)
*H02K 5/16* (2006.01)

(52) U.S. Cl.
CPC ............ *B26B 19/282* (2013.01); *H02K 1/34* (2013.01); *H02K 5/16* (2013.01); *H02K 7/14* (2013.01); *H02K 33/00* (2013.01); *H02K 33/12* (2013.01); *H02K 33/02* (2013.01)

(58) Field of Classification Search
CPC ...... B26B 19/282; B26B 19/284; H02K 1/34; H02K 33/00; H02K 33/12; H02K 33/02

USPC ............................................. 310/28, 30, 29
See application file for complete search history.

(56) References Cited

U.S. PATENT DOCUMENTS

| 3,295,808 | A | | 1/1967 | Webb |
| 4,326,138 | A | * | 4/1982 | Shtrikman ............ H02K 33/06 30/48 |
| 5,632,087 | A | | 5/1997 | Motohashi et al. |
| 6,933,630 | B2 | | 8/2005 | Kraus et al. |
| 6,991,217 | B2 | | 1/2006 | Shimizu et al. |
| 7,288,863 | B2 | | 10/2007 | Kraus |
| 7,841,090 | B2 | | 11/2010 | Eichhorn |
| 8,806,756 | B2 | | 8/2014 | Kraus et al. |
| 2009/0025229 | A1 | | 1/2009 | Kappes et al. |

(Continued)

FOREIGN PATENT DOCUMENTS

| DE | 10242094 | 4/2004 |
| JP | S5924226 | 2/1984 |

*Primary Examiner* — Burton Mullins
(74) *Attorney, Agent, or Firm* — Ronald T. Sia; Kevin C. Johnson (57) ABSTRACT

The present invention relates to electric appliances for personal care, in particular electric shavers, comprising a magnetic linear drive unit having first and second drive components supported for linear displacement relative to each other and adapted to magnetically interact with each other, wherein a drive support is provided for supporting the drive unit onto a mounting structure. The drive support supporting the drive unit onto a mounting structure of the installation environment is adapted to provide for at least one axis of rotation for at least one of the drive components of the drive unit allowing said at least one drive component to rotate relative to the mounting structure.

12 Claims, 3 Drawing Sheets

(56) References Cited

U.S. PATENT DOCUMENTS

2010/0175264 A1\* 7/2010 Shimizu ................ B26B 19/048
  30/45
2012/0019079 A1\* 1/2012 Ziegler ................ A61C 17/222
  310/29

\* cited by examiner

ELECTRIC APPLIANCE FOR PERSONAL CARE

FIELD OF THE INVENTION

The present invention relates to electric appliances for personal care, in particular electric shavers, comprising a magnetic linear drive unit having first and second drive components supported on a drive carrier for linear displacement relative to each other and adapted to magnetically interact with each other, wherein a drive support is provided for supporting the drive unit onto a mounting structure.

BACKGROUND OF THE INVENTION

Small sized electric appliances for personal care often include functional elements or working tools driven by an electric-type, more particularly magnetic-type drive unit which may be received within a housing element that may form a handpiece to be handheld.

For example, electric shavers may have one or more cutter elements driven by an electric drive unit in an oscillating manner where the cutter elements reciprocate under a shear foil, wherein such cutter elements or undercutters may have an elongated shape and may reciprocate along their longitudinal axis. Other types of electric shavers use rotatory cutter elements which may be driven in an oscillating or a continuous manner. The said electric drive may include an electric motor or a magnetic type linear motor, wherein the drive unit may include an elongated drive transmitter for transmitting the driving motion of the motor to the cutter element.

Such drive systems include sometimes linear-type drive units comprising first and second drive components reciprocating or oscillating relative to each other in a substantially linear manner, i.e. substantially along linear axes, wherein the driving forces may result from magnetic fields. For example, one of the drive components may include a permanent magnet, whereas another one of the drive components may include one or more magnetic coils to which pulsating electric current is applied to create pulsating magnetic fields, thereby causing the two drive components to oscillate relative to each other. One of the drive components connects to a transmission train transmitting the oscillating movement of the drive component onto the functional element to be driven such as the aforementioned cutter element, wherein such transmission train may include a transmitter pin directly connecting to the cutter element or indirectly connected thereto by means of a yielding bridge structure allowing for pivoting movements of the cutter element.

For example, US 2009/0025229 A1 or U.S. Pat. No. 7,841,090 B2 discloses an electric shaver having a pair of cutter elements provided under a shear foil and driven in an oscillating manner.

Furthermore, WO 03/103905 A1 and EP 0 674 979 A1 disclose linear oscillating drive units for shavers, wherein the drive components oscillating relative to each other in a linear manner include a permanent magnet on the one hand and a magnetic coil on the other hand.

In such systems, one of the drive components may be rigidly connected to a drive carrier which in turn is rigidly connected to the mounting structure or the installation environment which is often a handpiece formed by a housing part of the electric appliance in which the drive unit is received. For example, the permanent magnet may be rigidly supported or fixedly connected to an interior side of the handpiece via said drive carrier or a mounting structure connected thereto, whereas the other drive component including the magnetic coils may be movably supported on said drive carrier for allowing the linear oscillation, for example by means of a pendulum bearing. Due to the fixed connection of one of the drive components to the handpiece, undesired vibrations can be implied onto the handpiece, thereby reducing the handling comfort.

So as to reduce such undesired vibrations onto the handpiece, it already has been suggested to support both drive components displaceable relative to said drive carrier to allow both drive components to execute linear oscillation in a counteracting manner. For example, WO 03/103905 A1 suggests to not fix one of the drive components, but to fix the linkage or pendulum bars linking the two drive components to each other, to the drive carrier and thus, to the installation environment in terms of an inner portion of the handpiece housing. Such fixing of the pendulum bearing to the drive carrier allows both drive units to oscillate in the direction of the oscillation axis in a sort of reverse motion. When a first drive component moves to the left, the other drive component moves to the right, and vice versa. Such reverse oscillation may reduce the aforementioned undesired vibrations of the handpiece.

However, due to tolerances of the drive components and/or phase offset of the oscillating components of the drive, there still may be mismatch of the dynamic effects of the reverse motions and thus, vibrations that can be felt in the hand holding the handpiece. Such phase offset between the oscillating components of the drive may be caused, for example, by frictional effects between the shear foil and the cutter elements. When the components are not oscillating in exact 180° phase opposition, vibrations arise.

SUMMARY OF THE INVENTION

It is an objective underlying the present invention to provide for an improved electric appliance for personal care avoiding at least one of the disadvantages of the prior art and/or further developing the existing solutions. A more particular objective underlying the invention is to provide for an improved drive unit structure reducing vibrations onto the installation environment surrounding the drive unit without sacrificing drive efficiency under high oscillation frequencies. A still further objective is to allow for less restrictive manufacturing tolerances of the drive components without reducing performance characteristics such as stable oscillation frequencies, sufficient amplitudes and low vibrations. Another objective is to avoid complicated mounting structures and to allow for installation of the drive unit into housing elements forming handpieces without requiring additional space or redesigning established ergonomic housings. A further objective is to reduce undesired vibrations due to phase offset between the oscillating components of the drive.

To achieve at least one of the aforementioned objectives, the electric appliance provides for a rotatory degree of freedom for the drive unit although said drive unit is of the linear oscillation type. More particularly, the drive support supporting the drive unit onto a mounting structure of the installation environment is adapted to provide for at least one axis of rotation for the drive carrier, thereby allowing the drive components to rotate relative to the mounting structure in addition to linear oscillation relative to each other and relative to the drive carrier. Due to such additional rotatory degree of freedom, the drive components may not only linearly oscillate relative to each other, but together they also may pivot or rotate to some degree due to the rotatory freedom of the drive carrier, what significantly reduces vibrations onto the installation environment. On the one hand, the drive components may oscillate relative to each other and relative to the drive carrier along a linear oscillation axis, and, on the other hand, when oscillating on the drive carrier, the drive components may, together with the drive carrier, rotate about said at least one axis of rotation due to the rotatory freedom of the drive carrier. Torques caused by manufacturing tolerances and phase offset between the oscillating components of the drive are not transferred to the mounting structure of the installation environment, thus allowing for a more comfortable handling of the electric appliance.

These and other advantages become more apparent from the following description giving reference to the drawings and possible examples.

BRIEF DESCRIPTION OF THE DRAWINGS

FIGS. 2A-2B: is a plane view of a drive unit including magnetic-type drive components supported for linear oscillation and the surrounding mounting structure, wherein FIG. 2A shows in a more schematic generalized view the drive components' movable support on a drive carrier and the drive support connecting the drive carrier to the mounting structure, said drive support including leaf springs connecting the drive carrier to the surrounding mounting structure and providing for a rotatory degree of freedom for the drive carrier and thereby, for the drive components of the drive unit relative to the surrounding mounting structure, whereas FIG. 2B shows a more detailed view of the drive components' movable support on a drive carrier and the drive support formed by leaf springs connecting the drive carrier to the mounting structure, FIG. 3: a partial perspective view of one of the leaf springs of the drive support connecting the drive unit to the surrounding mounting structure of the embodiments of FIGS. 2A-2B, FIG. 4: a plane view of a prior art drive unit of the linear oscillation type where the drive unit is rigidly fixed to the surrounding mounting structure.

DETAILED DESCRIPTION OF THE INVENTION

In order to avoid transfer of rotatory vibrations due to torques generated in the drive unit due to tolerances or phase offset, the drive unit including the drive components is allowed to execute rotatory movements relative to the surrounding mounting structure. More particularly, the drive carrier movably supporting the drive components for allowing linear oscillation thereof, is allowed to rotate relative to said surrounding mounting structure, wherein said drive components are linear drive components oscillating relative to each other and relative to said drive carrier along a substantially linear displacement or oscillation axis. According to an aspect, the drive support supporting the drive carrier and thus the drive unit onto the mounting structure, is adapted to provide for at least one axis of rotation for said drive carrier to allow the drive carrier and thus, the drive components to rotate relative to the mounting structure about said at least one axis of rotation in addition to the oscillation thereof which is relative to the drive carrier. Due to such axis of rotation, the drive unit is separated from the surrounding mounting structure in terms of rotatory vibrations and torques.

In order to dampen rotatory movement of the drive unit about said additional rotatory degree of freedom, the drive support may include a damper dissipating rotatory energy of the drive unit and retarding movements of the drive unit about said at least one axis of rotation.

In addition or in the alternative to such damper, the drive support may include at least one elastic restoring element for elastically restoring the drive unit into a rotatory or angular home position about said at least one axis of rotation. Such elastic restoring element and the aforementioned damper may form an integral unit, wherein in particular the elastic restoring element may provide for some damping effect on rotation of the drive carrier. In other words, such elastic restoring element may form the aforementioned damper dissipating the rotatory energy of the drive unit relative to the rotatory degree of freedom.

According to an aspect, the drive support may include a pair of spring elements supporting the drive carrier relative to the mounting structure, wherein said pair of spring elements may define a four point joint supporting the drive carrier rotatable about said axis of rotation. The spring elements may form a spring bar linkage allowing rotatory movements of the respective component of the drive support to which the spring bar linkage is connected, wherein the spring bar linkage may elastically deform to allow such rotatory movement. More particularly, the aforementioned spring elements may bend and/or yield and/or be tensioned and/or be compressed, thus allowing rotatory movement of the component of the drive unit to which the spring elements are connected.

More particularly, the aforementioned four point joint defined by said pair of spring elements may have two points fixed with the mounting structure and two other points fixed with the drive carrier or a structural element connected therewith, wherein the two points fixed with the drive carrier—and thus the drive carrier—may move relative to the mounting structure due to elastic deformation of the spring elements, thus allowing for rotatory movement of the drive unit relative to the surrounding mounting structure which may be the handpiece of the appliance.

The drive support and/or the aforementioned spring elements may be adapted such that the axis of rotation about which the drive carrier may rotate is substantially coaxial with a center of rotational vibrations of the drive components oscillating relative to each other and/or coaxial with a center axis of gravity or a balancing axis of said drive unit onto which the entire drive unit could be balanced against gravity. The aforementioned center of rotational vibrations may be in a region somewhere between the first and second drive components, wherein the exact position of such center of rotational vibrations may depend on several factors such as the weight of each of the drive components, the rigidity of the supporting elements supporting the drive components for linear oscillation and the kinematics defined by the support elements allowing for linear oscillation. Such center of rotatory vibrations may be determined, for example, by testing and/or by calculation methods such as finite element methods.

The aforementioned pair of spring elements forming the drive support, may include leaf springs on opposite sides of the drive unit which leaf springs may be arranged at an obtuse angle relative to each other. More particularly, the said leaf springs, with their longitudinal axis, may define a virtual intersection point which is positioned in a center region of the drive unit. For example, the leaf springs on opposite sides of the drive unit may be offset from a centerline going through both opposite sides towards an end portion of the drive unit so that the leaf springs arranged at an obtuse angle relative to each other define, with their longitudinal axes said virtual intersection point close to the center of the drive unit. In particular, the longitudinal axes of the leaf springs may intersect in the center point of gravity of the drive unit and/or in the center of the rotational vibrations of the drive components when the drive support is in a neutral position.

According to an aspect, the drive support may provide for multiaxial rotatory degree of freedom so that the drive unit and/or at least the active drive component thereof may rotate about a plurality of axes of rotation.

According to an aspect, there is at least an axis of rotation extending transverse to the oscillation axis of the drive unit and/or transverse to a longitudinal axis of a handpiece of the electric appliance. More particularly, the axis of rotation may extend substantially perpendicular to a plane defined by the oscillation axis of the drive unit and a virtual line connecting the drive unit with the functional element to be driven and/or substantially perpendicular to a plane defined by the oscillation axis of the active drive component of the drive unit and the oscillation axis of the functional element to be driven, for example the cutter element of a shaver oscillating transverse to the shaver's longitudinal axis.

The aforementioned rotatory degree of freedom of the drive support may be provided for both drive components oscillating relative to each other. Such degree of freedom for both first and second drive components may help in avoiding angular mismatch of the two components with each other so that is becomes possible to provide for only very small gaps between the first and second drive components, thereby increasing efficiency.

Said first and second drive components may be movably supported in different manners on the drive carrier so as to allow for linear oscillation relative to each other. For example, the first and second drive components may be supported separately and/or independently from each other onto the drive carrier structure. In the alternative, the first and second drive components may be connected to each other for example by means of a pendulum bearing or a four point bearing allowing for linear oscillation of the drive components relative to each other. For example, a pair of pivot bars or leaf springs may connect the first drive component to the second drive component such that said first and second drive components may oscillate relative to each other along an oscillation axis, wherein the pivot bars or leaf springs may pivot and/or bend to allow such relative oscillation. In particular, said pendulum bearing may be configured in terms of a parallelogram support allowing the drive components to oscillate due to twisting and/or rotating of the pendulum legs.

The support of the drive components onto the drive carrier may be configured in various ways. For example, there may be a pendulum bearing or a four point bearing supporting one of the drive components on the drive carrier. When the first and second drive components are connected to each other by means of a parallelogram linkage or the leaf springs as described above, the pendulum bearing may also support such parallelogram linkage or leaf springs on the drive carrier in a movable way, thereby supporting the drive components relative to the drive carrier in a sort of indirect way, namely by means of a first pendulum bearing supporting the drive components relative to each other and a second pendulum bearing supporting the first pendulum bearing relative to the drive carrier.

In particular, a pair of leaf springs may be provided for supporting one of the drive components—or the parallelogram legs or pendulum bearing connecting the drive components to each other—onto the drive carrier. Such leaf springs may extend on opposite sides of the drive components with longitudinal axis of the leaf springs extending substantially parallel with each other, wherein each of said leaf springs may have a connection point making connection to the drive carrier on one side of the drive components and a second point of connection making connection to the drive component on the opposite side of the drive carrier portion to which the leaf springs are connected. In other words, the leaf springs may form a sort of bridge extending over the drive component to which the leaf springs are not connected.

The drive carrier may be formed as a carrier plate which may have a planar configuration or a bent curved configuration. In the alternative, a carrier frame may be provided as drive carrier. The drive carrier may have a rigid configuration and may be formed, for example, as a metal body or a hard plastic body. For example, the carrier may be formed by a support beam to which the aforementioned pendulum bearing is connected, wherein particularly the aforementioned leaf springs forming the pendulum bearing or four point bearing or parallelogram support may be connected by such support beam forming the drive carrier.

The drive support mounting the drive carrier to the surrounding mounting structure may connect the drive carrier directly to the surrounding mounting structure, for example by means of the aforementioned leaf springs of the drive support having connection points at the drive carrier or attachment joints therewith. In the alternative to such direct support, the drive support, in particular the leaf springs thereof, may be connected to the aforementioned pivot bars or leaf springs of the pendulum bearing or four point linkage which connects the drive components to the drive carrier. Such indirect support of the drive carrier onto the surrounding mounting structure via said pendulum bearing or parallelogram support still may allow for rotation of the drive carrier and thus, the drive components relative to the surrounding mounting structure about said axis of rotation provided by the drive support. More particularly, the aforementioned leaf springs arranged at an obtuse angle relative to each other may connect such pendulum bearing or said pivot bars or said leaf springs connecting the two drive components to each other or to the drive carrier, to the surrounding mounting structure. Nevertheless, a direct connection of the rigid drive carrier plate or drive carrier frame to the surrounding mounting structure by means of said drive support may provide for easy mounting and manufacturing.

The aforementioned mounting structure of the installation environment may be a mounting frame received within a housing and/or held in a fixed position within a handpiece of the electric appliance. In the alternative, the mounting structure may be formed directly by an inner surface of a housing element or the handpiece.

The electric appliance for personal care may be an electric shaver including a handpiece formed by a shaver housing and a shaver head pivotably supported onto said handpiece about one or more pivot axes allowing for self-adaption of the shaver head to the contour of the skin to be shaved.

The shaver head may include only one cutter element, but the shaver head also may include two, three or more cutter elements. The shaver head may include further cutting or non-cutting functional elements such as a thermal element for cooling or heating a skin portion to be shaved, or a long-hair cutter, or fluid applicators to apply fluids such as deodorants, balms or lubricants onto the skin.

The transmission train for transmitting the drive power and movements of the electric linear motor to the at least one cutter element may have varying architectures and structures depending on the type of motor and the arrangement thereof. For example, the drive unit may include a reciprocating pin coupled to the aforementioned cutter element or undercutter directly or via an oscillation bridge allowing for pivoting of the cutter element relative to the angular orientation of the longitudinal axis of said pin.

These and other features become more apparent from the example shown in the drawings. As can be seen from FIG. 1, shaver 1 may have a shaver housing 2 forming a handpiece for holding the shaver, which shaver housing 2 may have different shapes such as—roughly speaking—a substantially cylindrical shape or box shape or bone shape allowing for ergonomically grabbing and holding the shaver, wherein such shaver housing 2 has a longitudinal shaver housing axis 25 due to the elongated shape of such housing, cf. FIG. 1.

Figure 1:
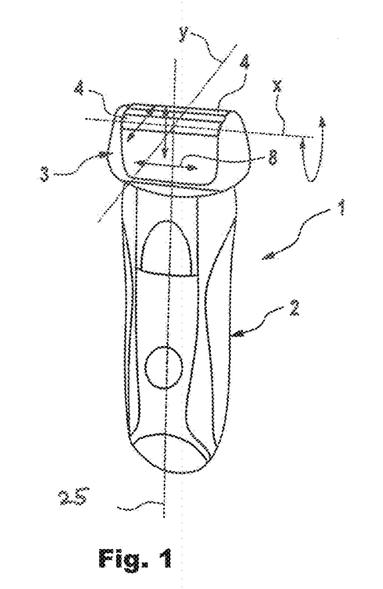
FIG. 1: is a perspective partial view of a small-sized electric appliance for personal care in terms of an electric shaver having a shaver head including two cutter elements drivable in an oscillating manner by a linear type drive unit received within the shaver housing forming the shaver's handpiece.

On one end of the shaver housing 2, a shaver head 3 is attached to the shaver housing 2, wherein the shaver head 3 can be pivotably supported about a shaver head pivot axis x extending substantially perpendicular to the aforementioned longitudinal shaver housing axis. The shaver housing 2 may have a pair of support arms projecting from the shaver head end of the shaver housing 2 between which support arms a carrier structure of the shaver head 3, for example in terms of a shaver head frame, can be pivotably mounted about said shaver head pivot axis x.

As can be seen from FIG. 1, the shaver head 3 may include a pair of cutter elements 4, wherein only one or three or more of such cutter elements 4 may be provided. Such cutter elements 4 may form block-like undercutters with a plurality of shearing blades cooperating with a shear foil covering the respective cutter elements 4. The said cutter elements 4 may have an elongated shape with a longitudinal axis extending substantially parallel to the aforementioned shaver head pivot axis and/or substantially parallel to the cutting oscillation axis 8 along which the cutter elements 4 are driven in an oscillating manner.

Figure 2A:
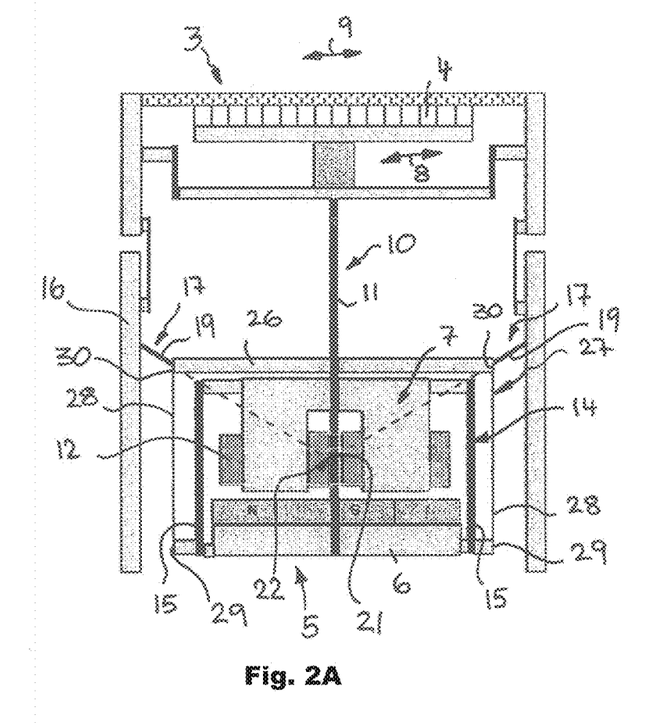

As can be seen from FIG. 2A, the drive unit 5 which may be received within the shaver housing 2 to drive the cutter elements 4 at the shaver head 3, is of the linear oscillating type and may include a first drive component 6 and a second drive component 7 which may oscillate relative to each other along an oscillation axis 9. Said first drive component 6 may form the active drive component coupled to the aforementioned cutter elements 4 by means of a transmitter 10 which may include a transmitter pin 11 extending from the drive unit 5 towards the shaver head 3. Such transmitter pin 11 may be directly coupled to the cutter elements 4, for example by means of a pivot bearing allowing for an additional transverse degree of freedom to compensate for pivoting of the shaver head 3. In the alternative, the transmitter 10 may include further transmission components such as a transmission bridge as it is per se known in the art.

As shown by FIG. 2A, said second drive component 7 may include one or more oscillating, magnetic coils 12, whereas the first drive component 6 may include one or more permanent magnets, wherein, however, an opposite arrangement may be chosen with the coils 12 associated with the first drive component 6 and the permanent magnets associated with the second drive component 7. The drive unit 5 further may include one or more resonance springs 13, cf. FIG. 2B, arranged between the first and second drive components 6 and 7 to promote oscillation of the first and second drive components 6 and 7 relative to each other at natural frequency.

Figures 2B, 3:
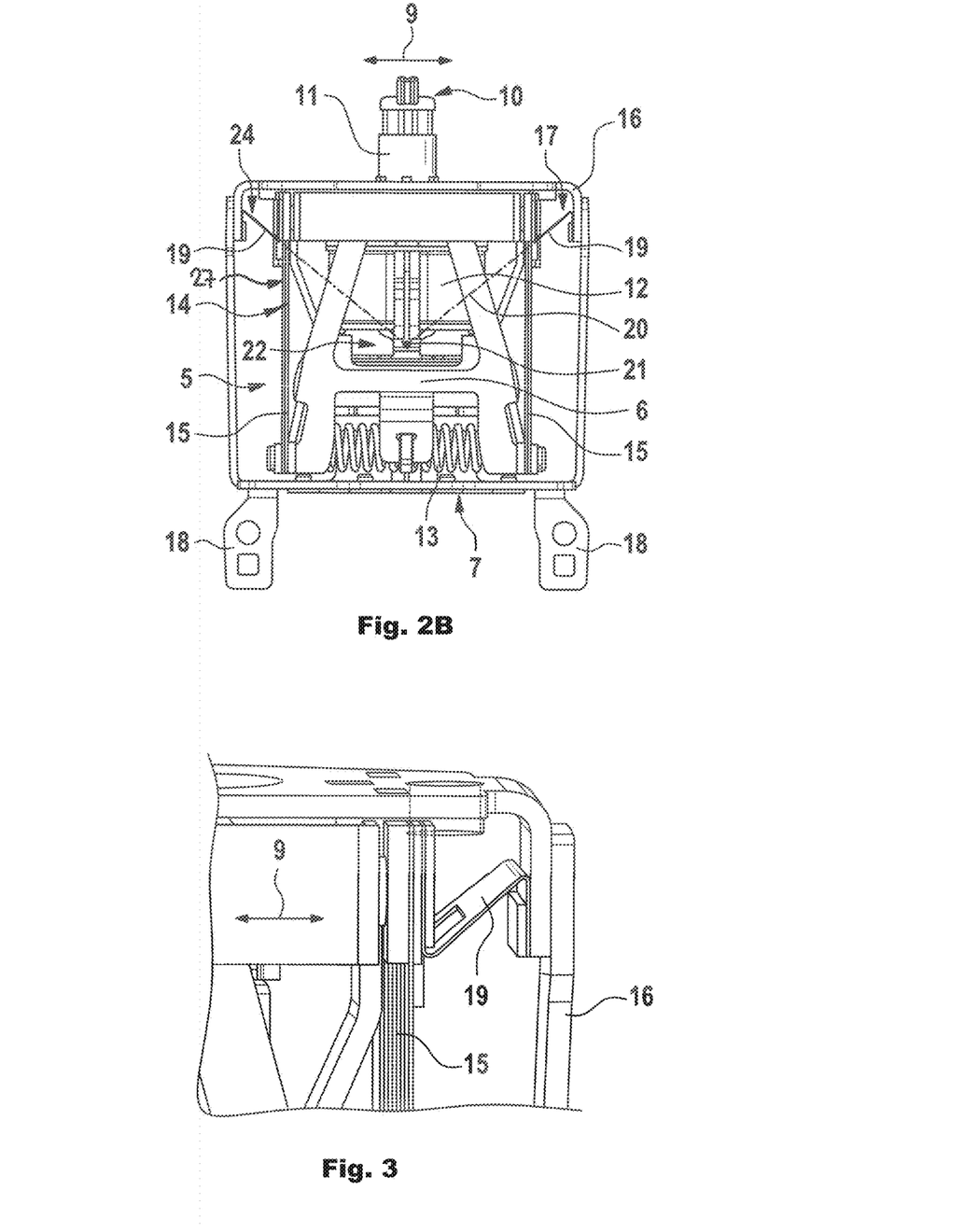
Figure 4:
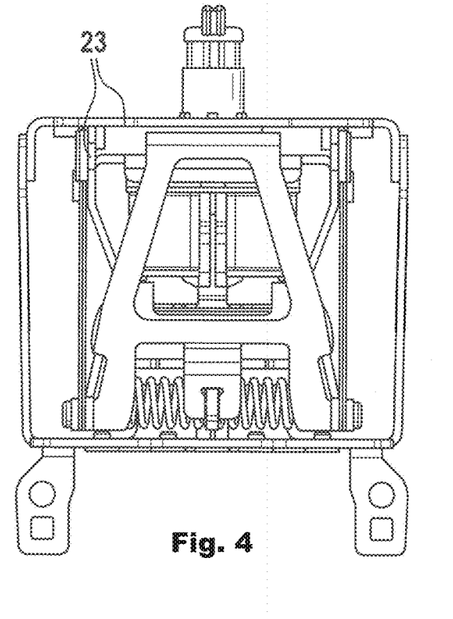
Figure 5:
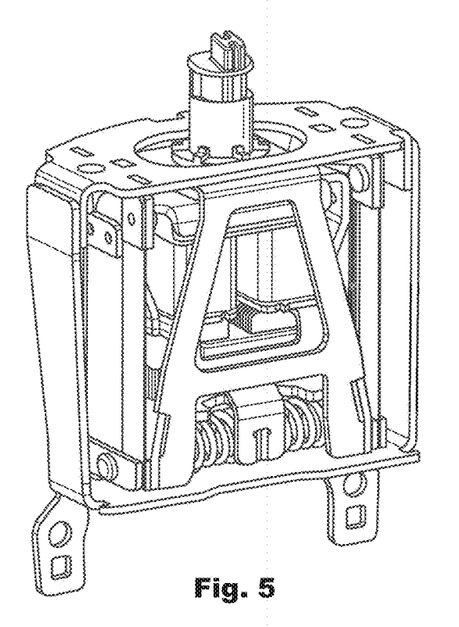
FIG. 5: a perspective view of the drive unit of FIG. 4.

As can be seen from FIG. 2A, the first and second drive components 6 and 7 may be connected to each other by means of a pendulum bearing 14 which may include a four point linkage formed by pendulum bars 15, cf. FIGS. 2A-2B. Such pendulum bars 15 may have some elasticity or may be formed by leaf springs that may bend, thus allowing relative movement of the drive components. In addition or in the alternative, said pendulum bars 15 may connect to the first and second drive components 6 and 7 at pivot joints allowing for pivoting of the pendulum bars 15 relative to the drive components 6 and 7, wherein such pivot joints may include rubber bearings or other elastic bearing means to provide for some elasticity to allow elastic pivoting of the pendulum bars 15 which may be rigid in such case or also elastic. In other words, the pendulum bars 15 may bend and/or pivot to allow linear oscillation of the drive components 6 and 7 relative to each other. Thus, both drive components 6 and 7 may execute linear oscillation, wherein such oscillation is effected in a sort of reverse motion. When the first drive component 6 moves to the left, the second drive component 7 moves to the right and vice versa.

To support the drive components 6 and 7 onto the drive carrier 26, a further pendulum bearing 27 may be provided which links one of the drive components 6 to the drive carrier. More particularly, such further pendulum bearing 27 may include a further pair of leaf springs 28 which may extend substantially perpendicular to each other on opposite sides of the drive unit, said leaf springs 28 each having a connection point 29 to the first drive component 6 and a connection point 30 to the drive carrier 26. Such second set of leaf springs 28 forms a sort of bridge extending from the first drive component 6 on one side of the second drive component 7 to the drive carrier 26 on the opposite side of the second drive component 7, thereby bridging the second drive component 7. Such further pendulum bearing 27 basically may have a configuration similar to the abovementioned other pendulum bearing 14. In particular, it may include rigid pendulum bars elastically supported at the connection points 29 and 30 by means of elastic pivot joints such as rubber bearings or other elastic bearing means to provide for some elasticity to allow elastic pivoting of the pendulum bars. Such elastic pivot joint also could be provided when using leaf springs 28 as pendulum linkage.

Said pendulum bearing 27 and/or said pair of leaf springs 28 may form a four point linkage and/or a parallelogram support allowing for a substantially linear oscillation of the drive components 6 and 7 relative to the drive carrier 26 along oscillation axis 9, cf. FIG. 2A.

As can be seen from FIG. 2A, said drive carrier 26 may be a rigid support frame which may be formed as a suspension bar from which the drive components 6 and 7 are suspended by means of the pendulum bearing 27. In addition to said pendulum bearing 27, the drive components 6 and 7 are connected to each other by the aforementioned other pendulum bearing 14 which may be formed by another set of leaf springs extending substantially parallel with the leaf springs 28.

Nevertheless it should be mentioned that supporting the drive components 6 and 7 onto the drive carrier 26 by means of the pendulum bearing configuration as described, is just one possible embodiment. Other types of support are possible.

The drive unit 5 is supported onto a mounting structure 16 by means of a drive support 17. Said mounting structure 16 may be a frame structure surrounding the drive unit 5, wherein, as shown by FIGS. 2A-2B, such mounting frame may form a closed ring or rectangle surrounding the drive unit 5. Said mounting structure 16 may be rigidly fixed to the shaver housing 2, for example by means of mounting flanges 18, or may be held in the shaver housing 2 in a fixed position by means of suitable fixation means such as screws or latching means. Said mounting structure also may be formed directly by the shaver housing 2.

As shown by FIGS. 2A-2B and 3, the drive support 17 mounting the drive unit 5 to the mounting structure 16 may include a pair of leaf springs 19 which are sufficiently resilient or yielding or a sort of soft so that the leaf springs 19 may bend and be deformed so as to allow for rotation of the drive unit 5 relative to the mounting structure 16.

Such leaf springs 19 may connect the aforementioned drive carrier 26 to the surrounding mounting structure 16, wherein such leaf springs may be directly connected to attachment portions of the drive carrier 26, cf. FIG. 2A. In the alternative, also an indirect support of the drive carrier could be provided, in particular in terms of connecting the leaf springs 19 to the pendulum bearing 14 or to the pendulum bearing 27, wherein the leaf springs 19 may be fixed to the pendulum bars 15 or to the leaf springs 28.

As shown by FIGS. 2A-2B and 3, said leaf springs 19 of the drive support 17 may extend at an obtuse angle so that longitudinal axes indicated by dashed line 20 of said leaf springs 19, more particularly of a central portion of said leaf springs 19 have a virtual intersection point 21 which is positioned in a center region of the drive unit 5. More particularly, the aforementioned leaf springs 19 may be arranged on opposite sides of the drive unit 5 and offset towards an end region of said drive unit 5, in particular the end region or end portion of the drive unit 5 facing the shaver head 3. The position and angular orientation of the leaf springs 19 is adapted such that the aforementioned intersection point 21 is positioned at least neighboring a center of gravity of the drive unit 5 when the drive carrier 26 and thus, the drive unit 5 are in their rotary home position, i.e. the neutral position held by the leaf springs 19 or drive support 17 with the drive components 6 and 7 being inactive.

More particularly, the drive support 17 and/or the leaf springs 19 thereof are adapted such that the axis of rotation 22 about which the drive unit 5 may rotate relative to the mounting structure 16, goes through the center of possible rotatory vibrations of the drive unit 5.

Due to bending of the leaf springs 19, the drive unit 5 may execute multiaxial pivoting or rotating. The drive support 17, however, provides for at least one axis of rotation 22, wherein such at least one axis of rotation 22 may extend in a direction transverse to the oscillation axis 9 of the drive unit 5 and/or transverse to the longitudinal axis of the housing or handpiece of the shaver 1. Referring to FIGS. 2A-2B and 3, said axis of rotation 22 may extend perpendicular to the drawing plane.

Due to bending and/or displacement of the leaf springs 19 and/or drive support 17, the exact position of the intersection point 21 may vary and the axis of rotation 22 may move. Thus, the drive unit 5 may execute, in addition to the rotatory movement, some linear displacement perpendicular to the axis of rotation.

In contrast to FIGS. 2A-2B and 3, FIGS. 4 and 5 show a conventional drive unit structure where the drive unit 5 as such is basically similar to the drive unit 5 of FIGS. 2A-2B and 3, wherein, however, the drive carrier supporting the drive components 6 and 7 for oscillation of the two drive components 6 and 7 relative to each other, is rigidly fixed to the mounting structure 16. Reference numeral 23 designates such rigid connection in FIG. 4.

The shaver head 3 may include further functional elements such as a long-hair cutter which may be arranged between the aforementioned pair of cutter elements 4.

The cutter elements 4 can be driven in an oscillating manner along cutting oscillation axis 8. In addition to such cutting movements, the cutting elements 4 can be pivotable and movable in directions transverse to said cutting oscillation axis 8.

In the context of the present application, the indefinite article "a/an" shall have the meaning "at least one/or more" if not specified contrarily. Furthermore, geometrical definitions such as "perpendicular to" or "parallel with" shall be understood as "at least substantially perpendicular to" or "at least substantially parallel with" to include the exact mathematical meaning, but not being restricted to. Still further, dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. An electric appliance for personal care, in particular electric shaver, comprising a magnetic linear drive unit having first and second drive components supported on a drive carrier for linear oscillation relative to each other and adapted to magnetically interact with each other, wherein a drive support is provided for supporting the drive unit onto a mounting structure, wherein said drive support provides for at least one axis of rotation for the drive carrier of the drive unit, thereby allowing said drive components to rotate relative to the mounting structure, wherein said drive support includes at least one elastic restoring element for elastically restoring the drive carrier into a rotatory home position about said at least one axis of rotation.

2. The electric appliance according to claim 1, wherein said drive support includes a damper for dampening movements of the drive carrier and the drive components supported thereon about said at least one axis of rotation.

3. The electric appliance according to claim 1, wherein said drive support includes a pair of spring elements supporting said drive carrier relative to said mounting structure, said pair of spring elements defining a four point joint supporting said drive unit rotatable about said at least one axis of rotation, wherein said four point joint includes two connection points fixed with the mounting structure and two connection points fixed with the drive carrier.

4. The electric appliance according to claim 3, wherein said pair of spring elements includes leaf springs on opposite sides of the drive unit arranged at an obtuse angle relative to each other.

5. The electric appliance according to claim 1, wherein the drive support is adapted to define said at least one axis of rotation to be substantially coaxial with a center of gravity or balance point of said drive unit.

6. The electric appliance according to claim 1, wherein the drive support is adapted to provide for said at least one axis of rotation extending transverse to the oscillation axis of the drive unit.

7. The electric appliance according to claim 1, wherein said first and second drive components are both supported movably relative to said drive carrier along a linear oscillation axis, which oscillation axis together with the drive carrier is pivotable about said at least one axis of rotation provided by the drive support so each of said first and second drive components is pivotable about said axis of rotation when linearly oscillation along said oscillation axis relative to each other and relative to said drive carrier.

8. The electric appliance according to claim 1, wherein said first and second drive components are connected to each other by means of a pendulum bearing or a four point bearing allowing for linear oscillation of said first and second drive components relative to each other.

9. The electric appliance according to claim 1, wherein at least one of said first and second drive components is connected to said drive carrier by means of a pendulum bearing or a four point bearing for linear oscillation of said at least one drive component relative to said drive carrier along said linear oscillation axis.

10. The electric appliance according to claim 8, wherein said pendulum bearing comprises at least one leaf spring.

11. The electric appliance according to claim 1, wherein said drive carrier is a rigid carrier plate or rigid carrier frame.

12. The electric appliance according to claim 9, wherein said drive support connects one of said rigid carrier plate, rigid carrier frame and pendulum bearing to the mounting structure.

* * * * *